US008782899B2

(12) United States Patent
Draht et al.

(10) Patent No.: US 8,782,899 B2
(45) Date of Patent: Jul. 22, 2014

(54) METHOD FOR ESTABLISHING A NAIL CONNECTION AND A NAIL FOR THIS PURPOSE (75) Inventors: Torsten Draht, Schloss Holte (DE); Gerson Meschut, Bielefeld (DE)

(73) Assignee: Bollhoff Verbindungstechnik GmbH (DE)

( * ) Notice: Subject to any disclaimer, the term of this patent is extended or adjusted under 35 U.S.C. 154(b) by 516 days.

(21) Appl. No.: 12/669,341

(22) PCT Filed: Jun. 25, 2008

(86) PCT No.: PCT/EP2008/005168
§ 371 (c)(1),
(2), (4) Date: Mar. 24, 2010

(87) PCT Pub. No.: WO2009/010165
PCT Pub. Date: Jan. 22, 2009

(65) Prior Publication Data
US 2010/0183404 A1    Jul. 22, 2010

(30) Foreign Application Priority Data

Jul. 16, 2007  (DE) .......................... 10 2007 033 126

(51) Int. Cl.
*B21D 47/00* (2006.01)
*B23P 11/00* (2006.01)
*B23P 17/00* (2006.01)

(52) U.S. Cl.
USPC ......... 29/897.32; 29/505; 29/521; 29/525.01; 29/527.2; 156/92; 411/440

(58) Field of Classification Search
USPC ................. 29/469, 505, 521, 525.01, 527.2, 29/897.32; 269/2; 411/453, 82.3, 411, 411/440, 450, 455–456, 499; 156/92
See application file for complete search history.

(56) References Cited

U.S. PATENT DOCUMENTS

| 1,912,222 | A | * | 5/1933 | Rosenberg | ................... 411/453 |
| 3,977,142 | A | * | 8/1976 | Dove et al. | ...................... 52/363 |
| 4,043,547 | A | * | 8/1977 | Glomb et al. | ................. 269/136 |
| 4,688,316 | A | * | 8/1987 | La Barge et al. | ................ 29/432 |
| 5,218,808 | A | * | 6/1993 | Ardley | ........................ 52/506.08 |
| 5,391,029 | A | * | 2/1995 | Fardell | .......................... 411/452 |
| 5,870,870 | A | * | 2/1999 | Utzman | ....................... 52/483.1 |
| 6,083,604 | A | * | 7/2000 | Haraga et al. | ................. 428/132 |

(Continued)

FOREIGN PATENT DOCUMENTS

DE  1500770  9/1969
DE  1940447  2/1971

(Continued)

OTHER PUBLICATIONS

Caroleene Paul, "Evaluation of pneumatic nailers," May 23, 2002, United States Consumer Product Safety Commission, p. 12.*

*Primary Examiner* — Alexander P Taousakis
(74) *Attorney, Agent, or Firm* — Seyfarth Shaw LLP (57) ABSTRACT A method for establishing a nail connection between two components and a nail for this purpose are described. The nail 6 is driven through the non-preholed components in the joint area at a high speed such that the nail point completely penetrates both components and a material collar, which extends into an adhesive layer between the two components, is only formed in the to driving direction in the nail-head-side component.

32 Claims, 6 Drawing Sheets

(56) References Cited

U.S. PATENT DOCUMENTS

| | | | |
|---|---|---|---|
| 6,758,018 B2 * | 7/2004 | Sutt, Jr. | 52/506.05 |
| 6,805,525 B2 * | 10/2004 | Oswald | 411/499 |
| 7,207,761 B2 * | 4/2007 | Dill et al. | 411/450 |
| 7,232,283 B2 * | 6/2007 | Dill et al. | 411/453 |
| 2002/0071741 A1 | 6/2002 | Oswald | |
| 2008/0149256 A1 * | 6/2008 | Wang et al. | 156/92 |
| 2008/0222873 A1 * | 9/2008 | Draht et al. | 29/432 |
| 2009/0194224 A1 * | 8/2009 | Jendrny | 156/92 |
| 2010/0084819 A1 * | 4/2010 | Stehmeier et al. | 277/317 |
| 2013/0008009 A1 * | 1/2013 | Draht et al. | 29/432 |

FOREIGN PATENT DOCUMENTS

| | | |
|---|---|---|
| DE | 7226710 | 7/1972 |
| DE | 3909725 C1 | 9/1990 |
| DE | 3922684 A1 | 1/1991 |
| DE | 19539685 A1 | 5/1996 |
| DE | 19637969 C2 | 4/2000 |
| DE | 10248427 A1 | 5/2004 |
| GB | 1210145 | 10/1970 |
| GB | 1479600 | 7/1977 |
| WO | WO 2007/082714 A1 | 7/2007 |

* cited by examiner

METHOD FOR ESTABLISHING A NAIL CONNECTION AND A NAIL FOR THIS PURPOSE

1. FIELD OF THE INVENTION

The present invention relates to a method for establishing a nail connection between two components by means of a nail, which is driven into the components at a high speed by a setting device, and a nail for this purpose.

2. BACKGROUND OF THE INVENTION

This method, also known under the term "bolt setting," is a forming jointing method, in which the nail (bolt) is driven at a high speed into the components to be joined. It has the advantage that in general one-sided accessibility of the joint area suffices and preholing operations can often be avoided. Bolt setting is already used as a reliable jointing method in many areas like steel construction, facade construction, metal construction, ship construction and building construction.

For example, nails (setting bolts) that are driven into steel, structural iron, sheet metal and similar metallic materials by means of setting devices in the form of powder-power-driven cartridges are known from DE 1 575 152, 1 940 447, 1 500 770. Such a nail normally consists of a nail head, a nail shank and an ogival nail point, wherein the shank can be provided with a surface profiling in the form of cross or arrow knurls, spiral running ribbings and the like.

A nail (bolt) with a flat head, a cylindrical shank and an ogival nail point, which serves to fasten sheets to a metal part that is stronger than the sheet, is known from DE-GM 72 26 710. The nail is shot into the metal part through a prefabricated hole in the sheet. A recess for receiving the material protruding out of it during the shooting into the metal part is provided in the head and/or in the shank of the nail. In accordance with one embodiment of this document, the recess is provided on the bottom side of the nail head so that the edge of the sheet surrounding the prefabricated hole is bent up into the recess by the displaced material of the metal part. The metal part, the thickness of which is considerably greater than the length of the nail, completely surrounds the nail point. The method disclosed in this document above all serves to fasten name plates on machines. This jointing method is not suitable for the fastening of sheets on extrusion profiles with a closed cross-section or on internal-high-pressure-reshaped components such as required for example in vehicle construction.

GB 1 479 600 describes a jointing method, in which a screw with a nail point is shot into two sheets. With the help of this method, the two sheets are neither fastened together nor is the screw permanently inserted so that it connects the two sheets reliably. Instead a preholing is replaced by the shooting in of the screw with a nail point, in that after being shot in the screw must be screwed tightly into the two sheets and thereby fastened. In the case of this type of fastening of the two sheets together, the plurality of process steps to be executed is a disadvantage. Furthermore, it is questionable whether the thread of the screw actually forms a reliable connection with the hole shot into the sheets.

A jointing method suitable for this purpose is for example the so-called direct fastening, also called "Flow Drilling Screw" (FDS). In this process (see e.g. DE 102 48 427 A1, DE 39 22 684 A1, DE 39 09 725 C1 and DE 196 37 969 C2), a screw with a flat screw head, a screw shank provided with a thread and a screw point is used. The screw is first installed at a high speed and with a corresponding contact pressure on the components to be joined. The frictional heat hereby occurring plasticizes the joined part material to be formed. Crater-like or toric appendages, in which the screw thread grooves out a counter thread, are hereby formed both opposite and in the feed direction. The screw-in process is complete when the screw has penetrated the components and the screw head is set on the upper component.

3. SUMMARY OF THE INVENTION

The object of the present invention is to create a method for establishing a connection between two components by means of a nail driven in at a high speed and a nail for this purpose, which can be used in the case of only one-sided accessibility of the components, requires no preholing of the components, enables an extremely simple and above all quick jointing method without rotation of the nail and still leads to a high connection quality.

In the case of the method according to the invention, a nail with a nail head, a nail shank and a nail point is driven into these parts to connect two components in a joint area. For improved fastening of the components together, adhesive is applied to at least one of the components so that the adhesive is arranged between the two components. After the components have been positioned with the help of a tensioning device such that a specified gap width of a gap is set between the two components, the aforementioned nail is driven in. The nail is driven in a mainly non-rotating and axial manner into the non-preholed components in the joint area at a high speed with the help of a setting device. The step of driving in the nail is designed such that a permanent connection is established between the two components, the nail point penetrates the nail-head-side component and at least pierces the component facing away from the nail head and only one material collar is formed in the nail-head-side component, which protrudes from the nail-head-side component in the direction facing away from the nail head. Based on the method described above, the advantages of the insertion of a bolt into two components at a high speed are combined with an adhesive layer arranged between these components. The adhesive layer and the alignment of the two components or the gap between the two components is thereby selected such that the adhesive layer has an almost constant thickness despite the joint and also at least contributes to the deformation of the nail-head-side component for a stabilization of the connection between the two components. The stabilizing effect within the framework of the established connection is achieved in that during the jointing method a material collar is formed on the nail-head-side component. This material collar only protrudes from the nail-head-side component in the driving direction. Opposite the driving direction, there is no formation of a material collar or bulge, which would for example prevent the optimal fitting of the nail head on the nail-head-side component. Furthermore, the above method enables the use of nails with nail heads that do not have a ring groove that receives material on the bottom side of the nail head.

In accordance with a preferred embodiment of the present method, the nail is driven in without a ring groove such that the nail head with a ring surface, which is defined by an inner ring radius and an outer ring radius, is supported on the nail-head-side component, the outer ring radius of which is greater than an outer radius of the material collar. In another embodiment of this method, it is also conceivable to set the inner ring radius to be greater than the outer radius of the material collar or to select the inner ring radius to be greater than a radius of the nail shank.

In accordance with a further preferred embodiment of the present method, the material and the geometry of the components to be fastened together and the gap width of the adhesive-containing gap between the two components is selected such that the material collar of the nail-head-side component to be designed only in the driving direction is supported on the component facing away from the nail head and bridges the gap between the nail-head-side component and the component facing away from the nail head. Further stabilization of the joint connection is thereby achieved. Moreover, in this embodiment, the self-supporting material collar also ensures the retention of the gap width with adhesive so that the adhesive between the two components is not displaced in the area adjacent to the joint area.

In accordance with a further embodiment of the present method, the adhesive is first applied in a locally restricted area to at least one of the components. Then a two-dimensional distribution of the adhesive between the nail-head-side component and the component facing away from the nail head is achieved through targeted positioning of the components using the tensioning device. This positioning distributes the adhesive amounts applied for example as a bead or bulge so that complicated adhesive layering of at least one component or adhesive distribution in a predefined layer thickness does not need to be performed. This method embodiment thus shortens the jointing method without having to accept losses in the quality of the connection.

It is also preferred that when the nail is set the nail point completely penetrates both components and passes through the component facing away from the nail head. In this type of method, a crater-like material bulge is formed in the component facing away from the nail head, which only projects from the component facing away from the nail head in the direction facing away from the nail head.

The nail shank, which can be designed cylindrically or even converging or diverging in the direction of the nail head, is preferably provided with a surface profiling, which is filled with displaced material during the jointing method.

The components can be made of steel, aluminum, magnesium or plastic with or without fiber content. The nail is preferably made of steel, in particular tempered steel, but can also be made of aluminum, magnesium, brass, ceramic or fiber-reinforced plastic.

The method according to the invention is characterized by great simplicity and extremely low jointing time, since a preholing of the components is not required and the nail is driven into and through the two components or into and at least just into the component facing away from the nail head without rotation in a single jointing process at a high speed. As confirmed in experiments, the connection between the two components established in this manner is characterized by a high connection quality. Another advantage of the method according to the invention is that two-sided accessibility of the joint area is not required when the component facing away from the nail head is sufficiently rigid.

In another embodiment of the method according to the invention, a nail in the form of a staple bolt is used, which has a nail head, a nail shank with a sawtooth profile and a nail point. The nail is driven into the non-preholed components in the joint area in a mainly rotation-free and axial manner by a setting device at a high speed such that the nail point pierces through the nail-head-side component and penetrates the component facing away from the nail head and such that only one material collar is formed on the nail-head-side component, which protrudes from the component facing away from the nail head in the direction facing away from the nail head, i.e. in the driving to direction. A crater-like material bulge is formed in the component facing away from the nail head if the nail at least partially pierces the component facing away from the nail head. The crater-like material bulge protrudes from the component facing away from the nail head in the direction facing away from the nail head. The sawtooth profile is preferably aligned such that each sawtooth tapers towards the nail point.

With this embodiment of the invention, a relatively thin component can be "stapled" to a relatively thick component by means of a staple bolt with the smallest dimensions. A complete or even partial piercing of the component facing away from the nail head is hereby possible.

Further advantageous embodiments and developments of the invention arise from the dependent claims.

4. DESCRIPTION OF THE ACCOMPANYING DRAWINGS

Exemplary embodiments of the invention are explained in greater detail based on the drawings.

5. DETAILED DESCRIPTION OF PREFERRED EMBODIMENTS

Figure 1A:
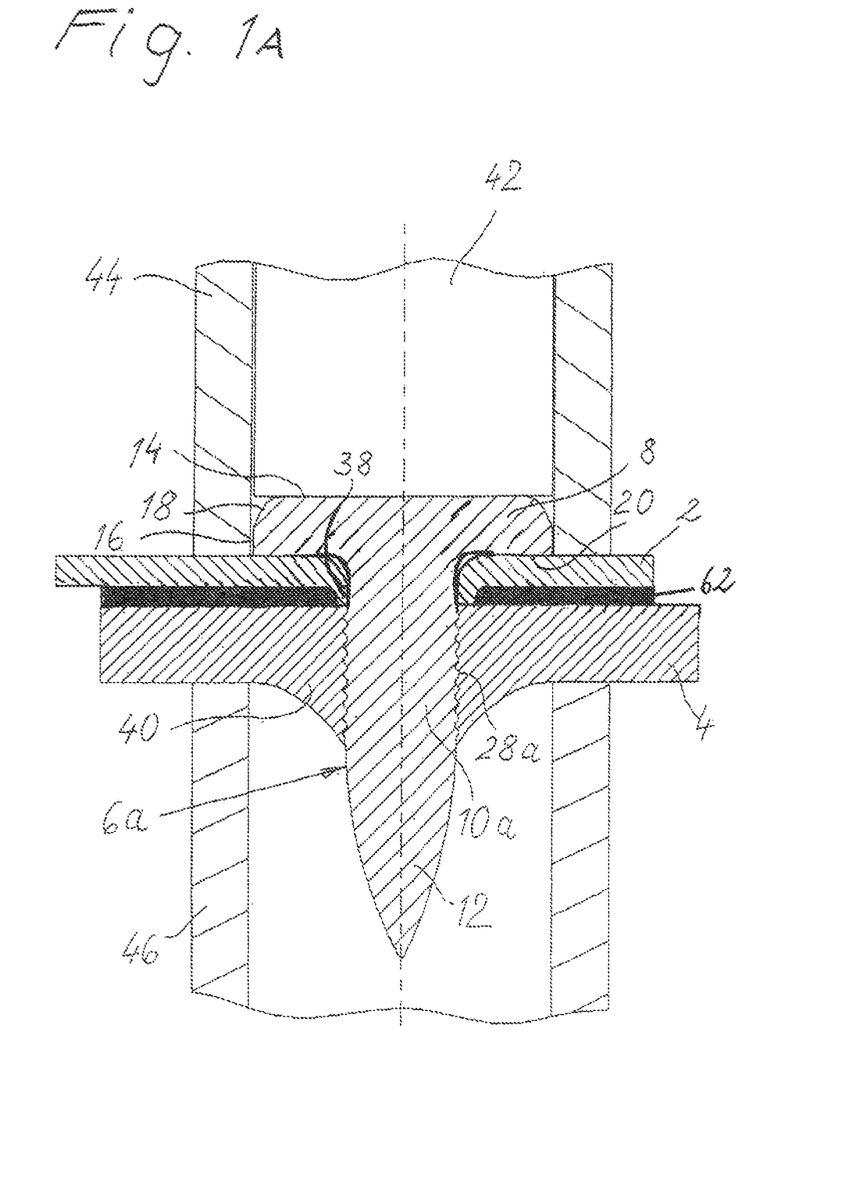
FIG. 1A shows a partially cut view of a connection established with the method according to the invention between two components by means of a nail with parts of the establishing device.

FIG. 1 shows a completed connection between a component 2 and a component 4 by means of a nail 6a. In the exemplary embodiment shown, the component 2 is a thin-walled component in the form a sheet and the component 4 is a component with a greater wall thickness, which is a profile component for example. For example, these can be body parts for vehicle construction although the invention is not limited to this.

The components 2, 4 can be made of steel, aluminum, magnesium or plastic with or without fiber content. They are not preholed before the jointing method, as will be explained in greater detail below.

Figures 2, 3:
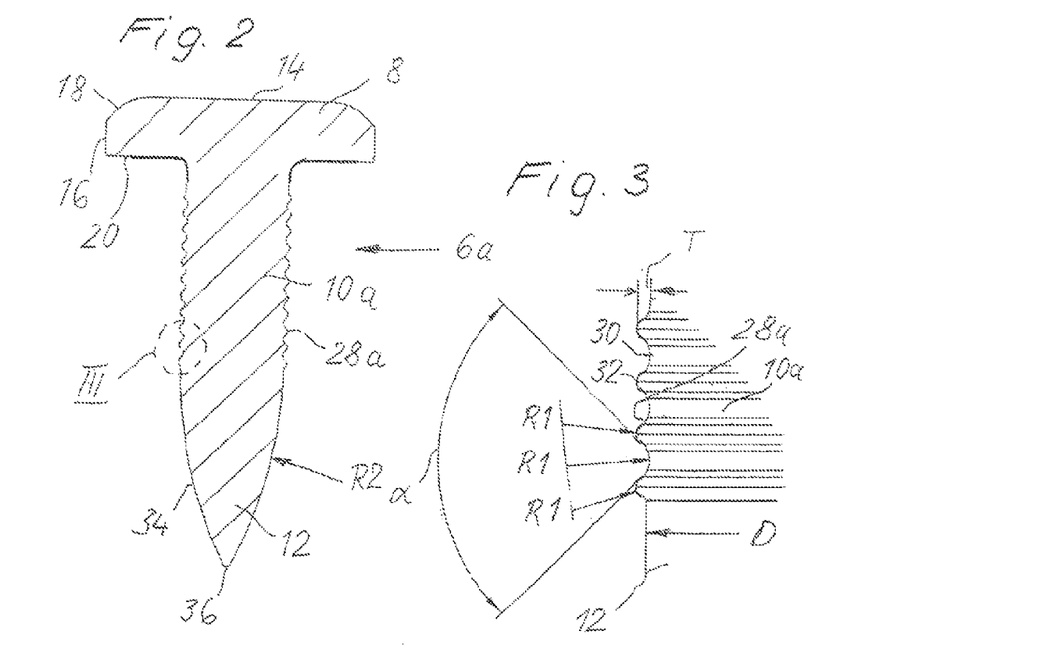
FIG. 2 shows a longitudinal cut through the nail in FIG. 1.
FIG. 3 shows an enlarged view of one detail of FIG. 2 labeled with III.

As can be seen in FIGS. 1 and 2, the nail 6a consists of a nail head 8, a nail shank 10a and a nail point 12. It is also preferred to design the nail as a functional bolt as described in DE 10 2007 017 590.8.

The nail head 8 is a flat head with an even top side 14, a cylindrical circumferential surface 16 and an even bottom side 20.

The nail shank 10a is designed mainly cylindrically in the exemplary embodiment in FIGS. 1, 2 and is provided with a surface profiling 28a in a certain area of its surface. As can be seen in particular from FIG. 3, the surface profiling 10a in the exemplary embodiment shown consists of a series of annular recesses 30 and rises 32. The surface profiling 28a thus has a rounded wave-like profile in axial cross-sections, which is designed in a sinusoidal manner in the exemplary embodiment shown. The radii of the recesses 30 and rises 32 labeled with R1 in FIG. 3 are thus identical. The angle α between the flanks of the rises 32 lies hereby on the order of magnitude of 90°.

As shown, the surface profiling 28a only has a relatively low depth. Preferably, the ratio of the depth T of the surface profiling 28a to the average shank diameter D is less than 0.1 and in particular less than 0.05. For example, this ratio lies on the order of magnitude of 0.03.

The nail point 12 has an ogival surface 34 with a rounded end point 36. The ogivality factor, that is the ratio of the radius R2 to the shank diameter D of the ogival surface 34, lies for example on the order of magnitude of 2 to 6, preferably in the range of 3 to 5 and is in particular approximately 4. The nail 6a including head, shank and point is designed in a rotation-symmetrical manner, which also applies to the exemplary embodiments in FIGS. 4 through 7 and 11.

The nail 6a is preferably made of steel. However, depending on the use, it can also be made of aluminum, magnesium, brass, ceramic or fiber-reinforced plastic. In the exemplary embodiment shown, the nail 6a is uncoated; however, it can also be coated.

As shown, the nail 6a is designed as one piece. However, it is also generally possible to produce the nail head on one hand and the nail shank with the nail point on the other hand from two parts with different hardnesses, which are then connected together. Thus, for example, the nail shank with the nail point can be made of metal and the nail head can be made of aluminum, which are then combined by means of friction welding.

The process for establishing the connection shown in FIG. 1 between components 2 and 4 by means nail 6a will now be described:

After the two components 2 and 4 have been aligned with each other in an arrangement to be joined, adhesive 62 is applied to at least one side on one of components 2, 4. Both steps can be performed in any order, i.e. also in the opposite manner. The side of the one component provided with adhesive 62 is turned towards the other component so that the adhesive 62 is arranged during the jointing (see below) between the components 2, 4. In this connection, it is also conceivable to apply the adhesive 62 to two opposite-lying sides of the components 2, 4 in order to achieve optimal connection properties.

In accordance with one embodiment, the adhesive 62 is two-dimensional, preferably all over at least one of the components 2, 4. It is also preferred to apply the adhesive 62 in locally limited areas on at least one side of one or both components 2, 4. This is for example realized through the application of an adhesive bead.

The two components 2, 4 are then positioned, for example in that they are mechanically pretensioned against each other. For positioning or pretensioning, one uses an external tensioning device (not shown) or a hold-down device 44. The positioning creates a desired gap between the components 2, 4 or a spacing between components 2, 4. At the same time, the setting of a defined gap width ensures that the adhesive 62 from the locally restricted areas is evenly distributed on the component(s). Thus, the adhesive 62 distributed evenly between the components is located within the gap of the defined gap width.

In accordance with another embodiment, the positioning through a pushing together of the adhesive layer 62 causes a prefastening of the components 2, 4 in the arrangement to be connected. Even if the adhesive layer 62 has not yet hardened, the components 2, 4 adhere together after the positioning. Based on the above, the tensioning device can be removed or loosened from the components without disrupting the set position of the two components 2, 4 with respect to each other. If for example the external tensioning device is removed from the components 2, 4, the subsequent driving in of the nails can be performed without local restrictions from the tensioning device. This procedure and this arrangement just favor the jointing of the nails by a robot, which continuously moves over a plurality of joints. The movement of the setting device is thereby not impeded by a tensioning device.

As already mentioned, the components 2 and 4 are not preholed before the jointing method. When the two components 2 and 4 are aligned in the arrangement to be connected, the nail 6a is driven into the two components 2 and 4 from above by a setting device at a high speed. The setting speed depends on the application and is e.g. between 5 and 300 m/s, preferably 10 and 100 m/s.

The bolt setting device is for example a bolt closing device, a powder-power-driven cartridge or the like. FIG. 1 shows a piston 42 of such a setting device. Furthermore, the mouthpiece 44 of a hold-down device that is not shown otherwise can be seen.

As already mentioned, the method according to the invention can be performed in the case of just one-sided accessibility of the joint. However, if the component 4 is not sufficiently rigid, a counterholder in the form of a casing 46 should be provided, on which the components 2, 4 are supported.

Figure 1B:
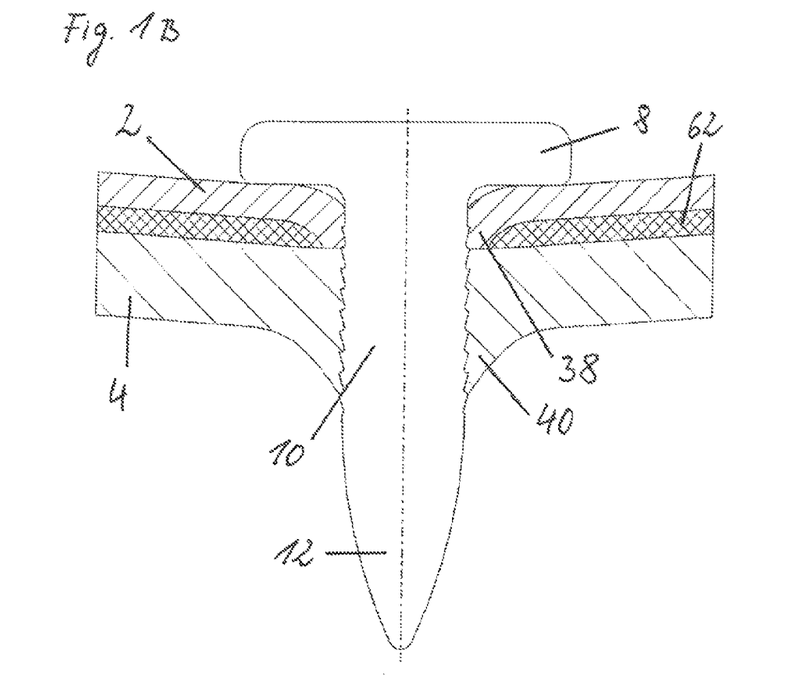
FIG. 1B shows a partially cut view of another connection established with the method according to the invention between two components by means of a nail.
Figure 1C:
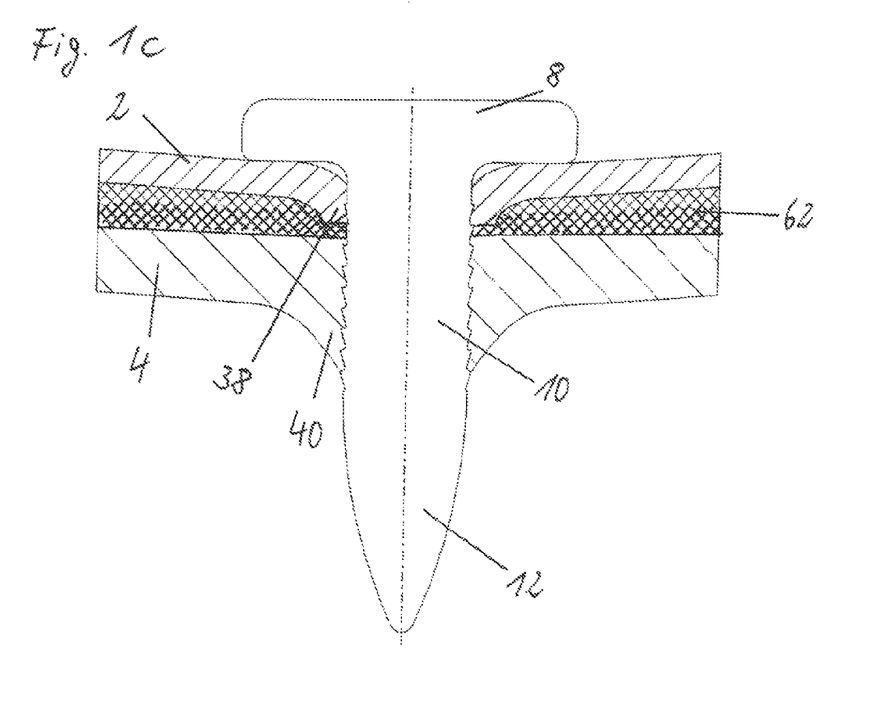
FIG. 1C shows a partially cut view of another connection established with the method according to the invention between two components by means of a nail with parts of the establishing device.

During the jointing method, the nail point 12 first penetrates the component 2. A material collar 38 is thereby only formed in the driving direction on the side of the component 2 facing away from the nail head. The material collar 38 surrounds the nail shank 10 and stabilizes in this manner the established joint connection between the components 2, 4. Moreover, the material collar 38 extends into the adhesive layer 62 as shown in FIGS. 1A-C. In accordance with a preferred embodiment of the present invention, the material collar 38 is additionally supported on the opposite-lying component 4, as can be seen in FIGS. 1A and B. This further embodiment of the method also supports the stability and lifespan of the established joint connection.

After the nail point 12 has pierced the component 2, it at least partially penetrates into the bottom component 4 (not shown) or pierces it completely (see FIG. 1A-C). This leads on one hand to a crater-like material bulge 40, which becomes bigger during the piercing of the nail point 12 in the driving direction. On the other hand, material flows into the surface profiling 28a, whereby the recesses of the surface profiling 28a are completely filled up with material 4. It is preferably material of the component 4. However, under certain circumstances, it cannot be prevented that the recesses of the surface profiling 28a fill at least partially with material of the component 2.

The jointing method is complete when the nail head 8 lies with its bottom side on the top side of component 2. The nail head 8 is designed such that it has a certain flexibility, in order to avoid gap formation under the nail head and to be able to counterbalance slight misalignments of the nail. When the setting die 42 is released from the nail head 8, the nail 6a springs back slightly. The components 2, 4 are hereby tensioned together, which benefits the connection quality.

Before driving the nail 6 into the components 2, 4, the adhesive 62 is distributed evenly on at least one of the components 2, 4 (see above). During and after the driving in of the nail 6 at a high speed, it has been surprisingly shown that the thickness of the adhesive layer 62 is retained despite the driving in of the nail 6. This applies in particular to the area near the joint zone, where the nail 6 penetrates both components 2, 4 and the material collar 38 is formed. In contrast to conventional processes, the adhesive 62 is not displaced from the area adjacent to the joint zone, so that for example an adhesive accumulation is formed between the two joints. This special feature of the method also ensures a reliable two-dimensional connection of the components 2, 4 via the adhesive layer 62. The enlarged connection shown in FIGS. 1B and C is achieved with adhesive layer thicknesses 62 greater than or equal to 0.1 mm. The thickness of the adhesive layer 62 preferably ranges from 0.1 up to and including 5 mm, while in one embodiment of the method the thickness is particularly advantageous from 0.3 mm of the adhesive layer 62 since the material collar 38 and the adhesive layer 62 complement each other here in a stabilizing manner.

As shown, the surface profiling 28a is only provided in the area of the nail shank 10a that is located within the material of the component 4 in the case of the completed connection. In this manner, a connection with high extraction stability is established since the components 2, 4 are tensioned together on one hand by frictional and form closure between nail shank 10a and component 4 and on the other hand by form closure between the nail head 8 and component 2. As shown, the components 2 and 4 in the parting plane remain mainly undeformed so that the evenness of the contact surfaces of the components 2 and 4 is retained. As can also be seen in FIG. 1, the nail point 12 mainly protrudes completely from the component 4.

As can be easily seen, accessibility only from the top side is required for the jointing process. The jointing process is extremely simple since neither preholing of components 2, 4 nor rotation of the nail 6a is required. The jointing period is extremely short. Moreover, only comparably low jointing forces are required. However, a high connection quality with correspondingly high extraction stability results.

As was shown further, the rounded form of the surface profiling 28a leads to comparatively low tensions in the connection between the components 2, 4 and the nail 6a, which contributes accordingly to the connection quality.

As can be seen in FIG. 1, the surface of the nail head 8 extends almost up to the outer edge (circumferential area 16) of the nail head 8. Only a relatively small rounding or bevel 18 is provided between the evenly designed top side 14 and the circumferential surface 16 so that the piston 42 on the nail head 8 mainly engages over its entire width.

When the bolt point 12 penetrates the components 2, 4, the greatest portion of the setting force from piston 42 is transferred to the central area of the nail head 8 so that correspondingly high tensions are created in the central area of the nail head 8. When the nail head 8 is placed on the top side of the component 2 at the end of the setting process, the greatest portion of the setting force is transferred from piston 42 to the radially outer area of the nail head 8 and from there via the outer surface of the bottom side 20 to components 2, 4, while the central area of the nail head 8 is decompressed. Thus, the nail 6 is preferably driven in such that little free space develops between nail 6 and component 2 in the transition area from the bottom side of the nail head 8 to the nail shank 10 (see FIG. 1A-C). This ensures that the nail head 8 lies on the top side of the component 2 via a ring surface. The outer ring radius of the ring surface is determined by the outer radius of the nail head 8. The inner ring radius of the ring surface is specified minimally by the radius of the nail shank 10. The inner ring radius of the ring surface is preferably set via the driving force of the nail 6 such that it is greater than or equal to the outer radius of the material collar 38. If one looks against the driving direction at the nail point 12, the supporting ring surface of the nail head 8 and the ring surface of the material collar 38 thereby do not cover each other in imaginary cross sections diagonal to the driving direction. It is thus ensured by the targeted setting of the size of the ring surface that the setting forces exerted by piston 42 are not fed to the nail shank 10a. In this manner, a "puncture" is avoided during the setting of the nail 6a on the component 2, even if the setting process was conducted with excess energy. In the case of a so-called "puncture," the nail head 8 penetrates the component 2 and a gap also forms between the surface profiling 28a of the nail shank 10a and the hole of the component 4.

The hold-down device 44 mainly serves to press components 2 and 4 against each other before and during the setting process. Hold-down forces less than 3 kN normally suffice. Higher hold-down forces for impacting the material properties of components 2 and 4 are not generally required.

The counterholder in the form of the shell 46, as already mentioned, is only required when the component 4 is not rigid enough.

Based on FIGS. 2 through 10, different embodiments of the nail that can be used in the method according to the invention will now be described.

Figure 4:
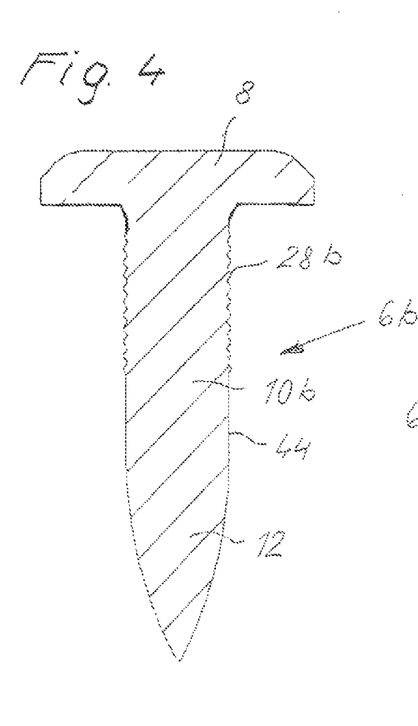
FIGS. 4 through 8 show longitudinal cuts according to FIG. 2 of modified embodiments of the nail according to the invention.

The nail 6b in FIG. 4 only differs from the nail 6a in FIG. 2 in that a cylindrical section 48 is provided between the nail point 12 and the part of the nail shank 10b provided with the surface profiling 28b, whereby the nail shank 10b receives a correspondingly long length. The longer nail shank 10b benefits the tension relief phase after the driving of the nail point into the components, whereby deformations of the components are reduced.

Figure 5:
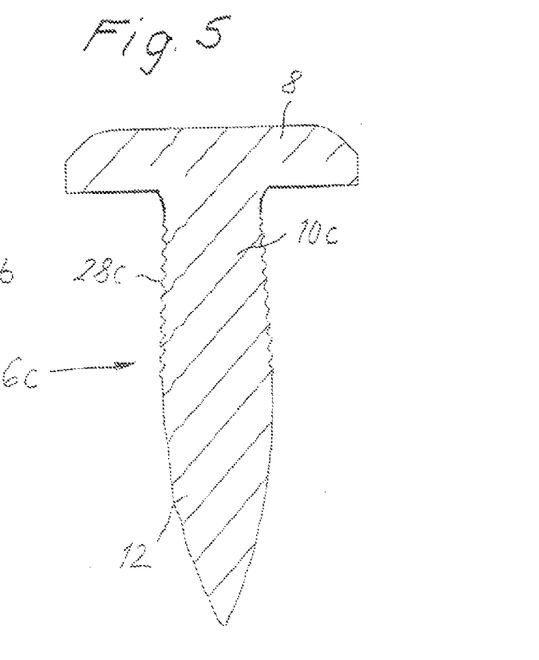

The nail 6c in FIG. 5 only differs from the nail 6a in FIG. 2 in that the nail shank 10a has a mainly conical form, which converges from the nail point 12 in the direction of the nail head 8. The surface profiling 28c is hereby adjusted to the conical form of the nail shank 10c such that its depth remains mainly constant. Through this "narrowing" of the nail shank 10c, a higher extraction stability of the connection is achieved.

Figure 6:
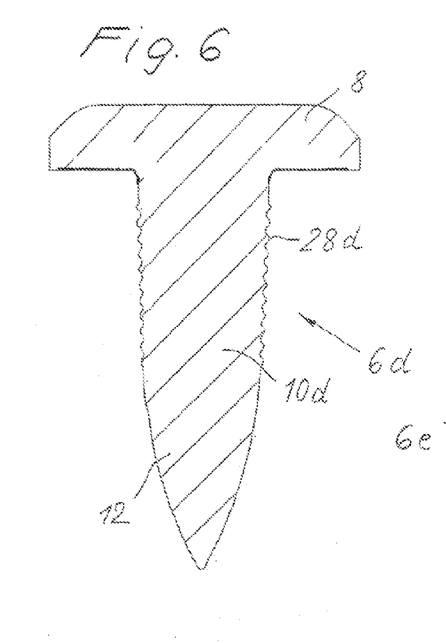

In the case of the nail 6d in FIG. 6, the nail shank 10d with the surface profiling 28d is also designed mainly conically, however such that it runs divergent from the nail point 12 in the direction of the nail head 8. A tension-favorable arrangement and a better tiling of the surface profiling 28d are hereby achieved.

Figure 7:
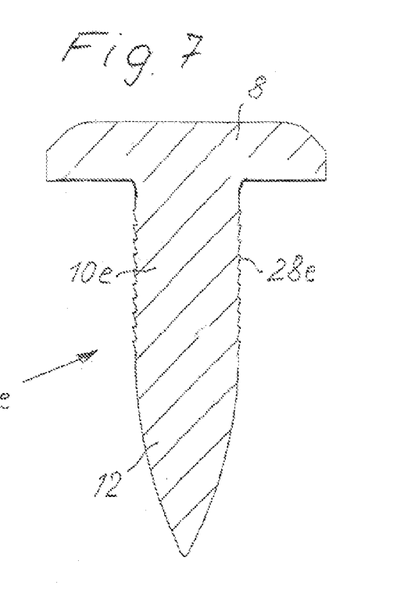

The nail 6e in FIG. 7 has a mainly cylindrical nail shank 10e with a surface profiling 28e, which is designed serrated in longitudinal cuts. This permits a higher extraction stability, which must however be gained through higher tensions in the connection.

Figures 8, 9, 10:
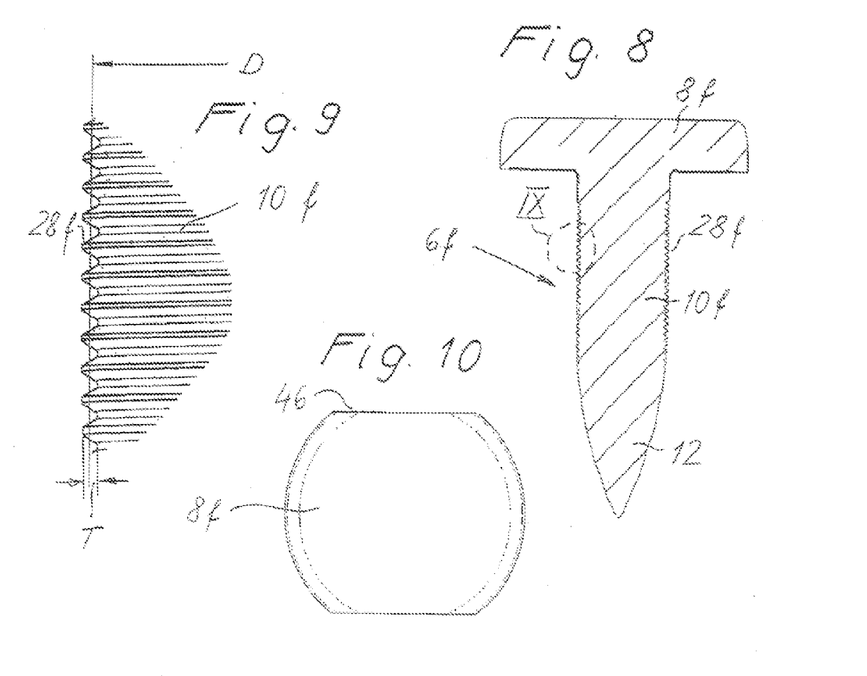
FIG. 9 shows an enlarged view of one detail of FIG. 8 labeled with IX.
FIG. 10 shows a view from the top of the nail head of the nail in FIG. 8.

The nail 6f in FIGS. 8 through 10 is provided with a surface profiling 28f in the form of a thread. The thread, which is shown enlarged in FIG. 9, is designed as an extra-fine thread, the pitch of which is preferably less than 3.5 and e.g. on the order of magnitude of 0.25.

The other jointing parameters in connection with the design of the surface profiling 28f are selected such that the nail 6f is driven through the two components 2, 4 during the jointing method without the nail 6f executing a noticeable rotation. As in the exemplary embodiments described above, the thread pitches of the surface profiling 28*f* hereby fill with plasticized material. A counter thread is hereby formed for components 2, 4. The nail 6*f* can thus be released again from the two components 2, 4 after the setting process. For this purpose, the nail head 8*f* is provided with a drive characteristic 46 such that the nail 6*f* can be unscrewed from the components using a tool (not shown).

Figure 11:
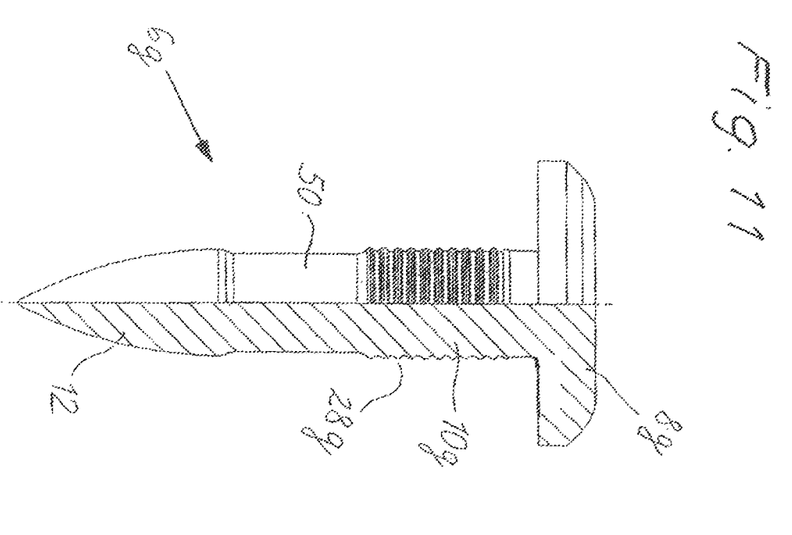
FIG. 11 shows a partially cut view of another embodiment of the nail according to the invention.

The nail 6*g* in FIG. 11 corresponds mainly with the nail 6*b* in FIG. 4, i.e. it has a nail head 8*g*, a nail shank 10*g* with a surface profiling 28*g*, a nail point 12 and a non-profiled section 50, which is arranged between the nail point 12 and the part of the nail shank 10*g* provided with the surface profiling 28*g*. However, in contrast to the exemplary embodiment in FIG. 4, the profile-free section 50 has a tapered form, i.e. its diameter is smaller than the maximum diameter of the nail point 12 and the diameter of the part of the nail shank provided with the surface profiling 28*g*. In the exemplary embodiment shown, the diameter-reduced section 50 is designed cylindrically; however, it could in general have a different geometric shape.

Due to the diameter reduction of the section 50, a pressure reduction is created during the driving of the nail 8*g* into the components 2, 4 as soon as the nail point 12 has completely penetrated the material of the components. This pressure reduction favors less deformation of the components 2, 4 and thus higher connection capabilities.

An important advantage of the described method is that only a very short setting duration is required for the setting of the nail. Furthermore, as already explained in detail, the method can be performed without preholing and in the case of only one-sided accessibility of the components. These advantageous properties make the described properties especially suitable for a "continuous nailing," as explained below:

Often, two components must be connected together at several spaced joints, for example along joint flanges. In the case of conventional mechanical jointing methods, the setting device is then moved from by a robot one after the other to the joints. At each joint, the setting device is first braked, the jointing method is performed and the setting device is accelerated again. This naturally leads to comparatively long cycle times. Thus, the jointing techniques punch riveting, clinching, blind riveting and nailing by means of the initially described FDS method require cycle times of 2-7 s, 2-6.5 s, 3-7.5 s or 3-8 s, respectively.

In contrast to the described discontinuous jointing of the components at joints, the method according to the invention permits a "continuous jointing." More exactly, the movement of the setting device from joint to joint created by the robot takes place continuously, wherein the nails are set according to the method described above during this feed motion. The components are advantageously held against each other in the correct position during the continuous progression of these jointing methods by corresponding tensioning devices. The only prerequisite is that the joints are accessible for the setting device. This is often the case when the joints are located on joint flanges.

The continuous nailing is facilitated in that for the setting of the nails according to the described process a precise activation of the joints in not generally required. The feed motion of the setting device performed by the robot can take place without contact. However, a mouthpiece (hold-down device 44 in FIG. 1) provided on the setting device can instead rest against the upper component 2.

In each case, there is a considerable reduction in the cycle times, since no braking or acceleration processes of the robot are required and also shorter setting times are achieved than with conventional mechanical jointing methods. Thus, cycle times on the order of magnitude of 1.5-3 s are possible with the described method, which amounts to a cycle time reduction of approx. 50%.

As already explained in connection with FIG. 1, it is advantageous to press together the components 2, 4 to be connected during the bolt setting by means of a hold-down device, wherein hold-down forces on the order of magnitude of up to 20 kN are conceivable. The hold-down device normally forms part of the setting device. A continuous nailing, as described above, is then not possible when using a hold-down device. However, instead of a hold-down device, a stationary tensioning mechanism (not shown) can also be provided, which presses the two components against each other with a corresponding force independently of the setting device and at points outside the joint areas. In this case, a continuous nailing is then possible in that the setting device proceeds without contact, wherein only a pin of the setting device has contact with the components to be connected and the mouthpiece of the setting device is thus moved in a way "floating" above the nail-head-side component.

In accordance with another embodiment (not shown) of a nail 6 similar to FIG. 7 designed according to the invention, its nail head is designed as a countersunk head. The nail head of the nail 6 has a diagonally running section on its bottom side. The diagonally running section is preferably slightly curved, in order to ensure an even force distribution between the nail head 8 and the top side of the component 2. Otherwise, the nail head 8 designed as a countersunk head has a considerably smaller thickness than the nail heads of the previous exemplary embodiments.

Based on the described geometry, the countersunk head of the nail 6 penetrates at least partially the top side of the component 2. More exactly, the nail head 8 deforms the upper component 2 so that a cone-like depression is formed, which the nail head 8*h* mainly received. Moreover, the components 2, 4 in the joint area, i.e. below the countersunk head, are deformed downwards so that the material collar 38 is in turn formed within the adhesive layer 62.

Figures 12, 13:
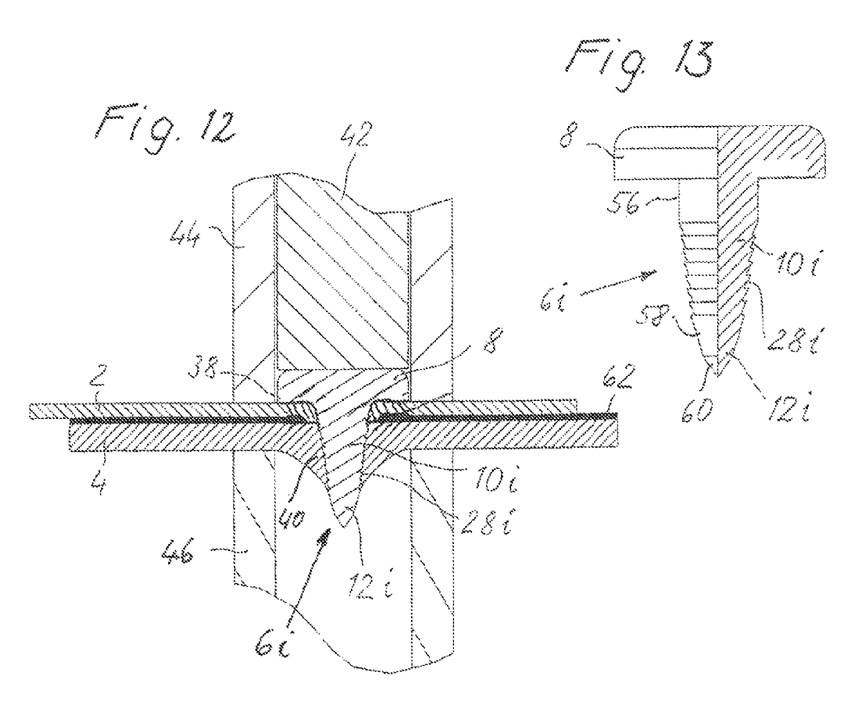
FIG. 12 shows a cut view of a connection between two components by means of a nail with parts of the establishing device according to a modified embodiment of the invention.
FIG. 13 shows a partially cut side view of the nail of the connection in FIG. 12.

FIGS. 12, 13 show an embodiment of the invention, in which the nail 6*i* is designed as a "staple bolt." It serves to "staple" a relatively thin component 2 to a thicker component 4. The component 2 is hereby stapled to the component 4 by one or more staple bolts, so that the adhesive layer 62 can harden.

The nail 6*i* designed as a staple bolt has a nail head 8 according to the exemplary embodiments in FIGS. 1 through 8. The shank 10*i* of the nail 6*i* is designed such that a cylindrical section 56 is connected to the nail head 8, which passes over into a conically tapering shank section with a sawtooth profiling 28*i*. The sawtooth profiling 28*i* is arranged such that each tooth tapers in the direction of the nail point 12*i* so that a radially running shoulder area is formed on the side of each tooth facing the nail head 8. The nail point 12*i* connected to the sawtooth profiling 28*i* is made up of a truncated conical section 58 and an apex-like section 60, wherein the cone angle of section 58 is less than the cone angle of section 60.

Even though in the exemplary embodiment shown the nail point 12*i* is made up of the two sections 58, 60 with different cone angles, the nail point can also be designed in another manner, for example as an ogival nail point according to the previous exemplary embodiments. The conicity of the nail point and the nail shank in the area of the sawtooth profiling 28*i* is important.

In turn in FIG. 12, similar to FIG. 1, a hold-down device 44 and a counterholder in the form of a shell 46 are shown.

The nail 6i designed as a staple bolt has considerably smaller dimensions than the previous embodiments of the invention. Thus, for example, the staple bolts have a length on the order of magnitude of 6 mm. Due to the described design of the nail shank 10i and the nail point 12i, an imaginary encapsulating end of the sawtooth profiling 28i in connection with the profile of the nail point 12i has a shape that is approximately similar to the shape of a parabola in axial cross-sections.

The geometry of the nail shank 10i and the nail point 12i and in particular the alignment of the surface profiling 28i ensure that the nail 6i can be driven into the components 2, 4 by the piston 42 (drive pin) of the otherwise unshown setting device with comparatively less driving force, while the extraction resistance against the driving direction is comparatively high due to the shoulder-like surfaces between the teeth of the sawtooth profiling 28i. An important advantage of the nail 6i designed as a staple bolt is that it barely affects the adhesive layer 62 during the "staple process." As shown in experiments, the thickness of the adhesive layer 62 is the same before and after the stapling process.

In the connection shown in FIG. 12, the nail head 12i protrudes far above the crater-like material bulge 40 of component 4. However, the nail 6i and the components 2, 4 are preferably dimensioned such that the free end of the nail point 12i only protrudes slightly or not at all from component 4. A solution, in which the free end of the nail point 12i just ends with the bottom end of the material bulge 40, is also conceivable.

As already mentioned, an important advantage of the method according to the invention consists in that the nail can be driven into the two components 2, 4 with one single hit from the bolt setting device so that the nail head lies on the nail-head-side component. This applies to all embodiments shown. However, it is generally also possible to perform the setting process such that the nail is driven into the component not quite all the way down by a hit from the setting device, but rather only for example 80 to 90% of the maximum possible penetration path. The further driving of the nail all the way into the component can then take place with one or more additional hits. These additional hits can either be performed manually with a hammer, for example using a drive pin, or mechanically. As determined in experiments, this "multi-stage" bolt setting has no negative impact on the stability of the connection, which applies both to components made of aluminum and to components made of steel.

The invention claimed is:

1. A method for establishing a connection between first and second non-pre-holed components in a joint area by a nail having a nail head, a nail shank and a nail point, wherein the component proximate the nail head is the first component and the other component is the second component, the method comprising:
   a. applying adhesive to at least one of the components so that the adhesive is arranged between the two components in an adhesive layer having a thickness,
   b. arranging the components spaced from each other,
   c. positioning the components with a tensioning device, thereby simultaneously setting a specified gap width of a gap between the two components,
   d. driving the nail in a substantially non-rotating and axial manner into the components in the joint area at a speed in a range of 5- 300 m/s with a setting device, thereby coupling together the two components, by causing the nail point to penetrate both components and forming only a material collar in the first component, the material collar protruding from the first component in the direction facing towards the second component, and extending into the adhesive layer,
   e. wherein the material collar is disposed on the second component and bridges the gap between the first and second components.

2. The method according to claim 1, wherein the two components are coupled such that the thickness of the adhesive between the two components adjacent to the joint area remains substantially constant.

3. The method according to claim 1, wherein in the step of driving the nail is performed without a ring groove such that the nail head is supported on the first component and the nail head includes a ring surface, defined by an inner ring radius and an outer ring radius, the inner ring radius being larger than an outer radius of the material collar.

4. The method according to claim 3, wherein the inner ring radius is larger than the outer radius of the material collar or greater than a radius of the nail shank.

5. The method according to claim 1, further comprising:
   applying the adhesive in a locally restricted area to at least one of the components and distributing the adhesive two dimensionally between the first and second components by pretensioning the components with the tensioning device.

6. The method according to claim 1, wherein the step of driving the nail includes setting the nail point so as to completely penetrate the components and protrude the nail point beyond the second component such that a crater-shaped material bulge is formed in the second component, the bulge protruding from the second component.

7. The method according to claim 1, wherein the nail shank is substantially cylindrical.

8. The method according to claim 1, wherein the nail shank converges in the direction of the nail head.

9. The method according to claim 1, wherein the nail shank converges in the direction of the nail head.

10. The method according to claim 1, wherein the nail shank is provided with a surface profiling that fills with displaced material while the two components are coupled together.

11. The method according to claim 10, wherein the surface profiling is arranged only in one area of the nail shank lying within the second component after the components are coupled together.

12. The method according to claim 10 or 11, wherein the ratio of a maximum depth of the surface profiling to an average diameter of the nail shank is less than 0.1.

13. The method according to claim 10, wherein the surface profiling in axial cross-sections includes a rounded, wave-shaped profile.

14. The method according to claim 10, wherein the surface profiling in axial cross-sections consists of a sawtooth-shaped profile.

15. The method according to claim 10, wherein the surface profiling includes a series of circular recesses and rises.

16. The method according to claim 10, wherein the surface profiling includes a thread forming a corresponding counter thread during the step of driving the nail.

17. The method according to claim 16, wherein a pitch of the thread is less than 0.35.

18. The method according to claim 16, wherein the nail head is structured to allow the nail to be removed from the two components.

19. The method according to claim 1, further comprising a profile-free section provided between a part of the nail shank provided with a surface profiling and the nail point.

20. The method according to claim 19, further comprising providing a diameter-reduced section between a part of the nail shank provided with the surface profiling and the nail point.

21. The method according to claim 1, wherein a top side of the nail head is substantially even up to an outer edge of the nail head to transfer setting forces impacting the nail head substantially to the first component in an end position of the nail and to thereby prevent the nail from puncturing both of the two components.

22. The method according to claim 1, wherein the nail point has an ogival form with an ogivality factor of 3 to 5.

23. The method according to claim 1, wherein the nail is a single piece and composed of at least one member selected from the group consisting of steel, aluminum, magnesium, brass, ceramic, and a fiber-reinforced plastic.

24. The method according to claim 1, wherein the shank and head of the nail are composed of materials with different hardnesses and are then coupled together.

25. The method according to claim 1, wherein the second component is a profile component with a greater thickness than the first component.

26. The method according to claim 1, wherein the components are composed of at least one member selected from the group consisting of steel, aluminum, magnesium, and plastic.

27. The method according to claim 1, wherein the nail head is a countersunk head having a bottom side with a diagonally running section such that the countersunk head at least partially punctures the material of the first component.

28. The method according to claim 1, wherein the components are tensioned against each other during the setting process by a hold-down device provided on the setting device or a tensioning mechanism independent of the setting device.

29. The method according to one of claim 1, wherein the step of driving the nail is performed with one single hit from the setting device.

30. The method according to claim 1, wherein the step of driving the nail is performed with one hit from the setting device and the nail is completely driven into the two components with one or more additional hits, the one or more hits being performed manually or mechanically.

31. The method according to claim 1, further comprising:
provisioning a nail shank with a sawtooth profile such that each sawtooth tapers towards the nail point.

32. The method according to claim 31, wherein an encapsulating end of the sawtooth profiling and the profile of the nail point include a substantially parabolic progression together in axial cross-sections.

* * * * *